(12) United States Patent
Long et al.

(10) Patent No.: US 6,348,163 B1
(45) Date of Patent: Feb. 19, 2002

(54) LIQUID CRYSTALLINE POLYESTERS COMPOSITIONS CONTAINING AROMATIC PHOSPHONITES AND A PROCESS FOR THE PREPARATION THEREOF

(75) Inventors: Timothy Edward Long, Kingsport, TN (US); William Ronald Darnell, Weber City, VA (US); James Rodney Bradley; Kab Sik Seo, both of Kingsport, TN (US)

(73) Assignee: Eastman Chemical Company, Kingsport, TN (US)

( * ) Notice: Subject to any disclaimer, the term of this patent is extended or adjusted under 35 U.S.C. 154(b) by 0 days.

(21) Appl. No.: 09/212,172

(22) Filed: Dec. 16, 1998

Related U.S. Application Data

(60) Provisional application No. 60/100,992, filed on Sep. 18, 1998.

(51) Int. Cl.[7] .................. C09K 19/52; C08K 3/34; C08G 63/00
(52) U.S. Cl. .................. 252/299.01; 252/299.62; 252/299.67; 524/492; 528/190; 528/193; 528/194; 528/195
(58) Field of Search .................. 252/299.67, 299.01, 252/299.62; 428/1; 528/190, 192, 193, 194, 195; 524/495, 496, 492

(56) References Cited

U.S. PATENT DOCUMENTS

| | | | |
|---|---|---|---|
| 4,169,933 A | * 10/1979 | Jackson et al. .............. 528/190 |
| 5,173,562 A | 12/1992 | Wilson et al. | |
| 5,185,426 A | 2/1993 | Verheijen et al. | |
| 5,264,539 A | 11/1993 | Shepherd | |
| 5,690,859 A | * 11/1997 | Takayanagi et al. ... 252/299.67 |
| 5,710,237 A | * 1/1998 | Waggoner et al. .......... 528/190 |
| 5,891,532 A | * 4/1999 | Furuta et al. ............... 428/1 |
| 5,969,083 A | 10/1999 | Long et al. .............. 528/194 |
| 6,022,491 A | 2/2000 | Samuels et al. ....... 252/299.01 |
| 6,121,369 A | 9/2000 | Stack et al. ............... 524/495 |

FOREIGN PATENT DOCUMENTS

| | | |
|---|---|---|
| EP | 0 158 501 | 10/1985 |
| JP | 05-140421 | * 6/1993 |
| JP | 05-140423 | * 6/1993 |
| JP | 08-325441 | * 12/1996 |
| WO | 9725363 | * 7/1997 |
| WO | 9.855547 | * 12/1998 |

OTHER PUBLICATIONS

Jackson et al., "Liquid Crystal Polymers. 5. Liquid Crystalline Polyesters Containing Naphthalene Rings", Macromolecules, vol. 17, (7), pp. 1027–1038, 1983.*
CAPLUS 1993: 582147.*
CAPLUS 1993: 582194.*
CAPLUS 1997: 140485.*
Derwent Abstract, DD 152569, Dec. 2, 1981.
Derwent Abstract, JP 3–221521, Sep. 30, 1991.
Derwent Abstract, JP 02051524, Feb. 21, 1990.
Derwent Abstract, JP 63–277233, Nov. 15, 1988.
Derwent Abstract, JP 05140423, Nov. 18, 1991.

* cited by examiner

Primary Examiner—Shean C. Wu
(74) Attorney, Agent, or Firm—Bernard J. Graves, Jr.; Cheryl J. Tubach

(57) ABSTRACT

Disclosed are novel compositions containing an LCP and one or more aromatic phosphonites. Also disclosed is a novel process for preparing LCPs in the presence of one or more aromatic phosphonites. The process enables the preparation of LCPs in a more controlled manner so that the LCPs have excellent thermal/oxidative stability. The LCPs are useful where the combination of good mechanical properties, excellent thermal resistance properties, and excellent thermal stability are desired, such as in electrical/electronic applications and electrical connectors.

90 Claims, No Drawings

LIQUID CRYSTALLINE POLYESTERS COMPOSITIONS CONTAINING AROMATIC PHOSPHONITES AND A PROCESS FOR THE PREPARATION THEREOF

REFERENCE TO RELATED APPLICATION

This application claims the benefit of U.S. Provisional Application 60/100,992 filed on Sep. 18, 1998.

FIELD OF THE INVENTION

This invention pertains to compositions containing a particular class of liquid crystalline polyesters and one or more aromatic phosphonites. This invention also pertains to a process for preparing liquid crystalline polyesters in the presence of one or more aromatic phosphonites.

BACKGROUND OF THE INVENTION

Liquid crystalline polyesters (LCPs) are unique among polymers because they have very high tensile, flexural, and temperature resistance properties which are very desirable properties for high performance applications, such as in structural applications and in electronic applications. U.S. Pat. No. 4,169,933 discloses a group of liquid crystalline polyesters which consist essentially of residues of terephthalic acid, 2,6-naphthalenedicarboxylic acid, hydroquinone, and p-hydroxybenzoic acid. It is highly desirable that these types of LCPs have the very best thermal stability so that their molecular weight is maintained, i.e., during their preparation and injection molding, extrusion, etc., into the many end uses that have been identified where they show superior performance. Unless measures are taken during the preparation of such liquid crystalline polyesters, the polymerization rate may be so rapid that an appreciable amount of the starting materials may be lost due to co-distillation, sublimation, or other means. Loss of starting materials may lead to (a) loss of stoichiometry, (b) reduced yield of polymer, and (c) plugging or partial plugging of the reactor condensing system due to the solids being co-distilled or sublimed. Also, when the polymerization rate is very fast, it is more difficult to control the process and produce a predetermined molecular weight or inherent viscosity (I.V.).

It is an object of this invention to provide novel compositions containing one or more liquid crystalline polyesters. It is also an object of this invention to provide liquid crystalline polyesters comprising certain levels of terephthalic acid, cyclohexanedicarboxylic acid, 2,6-naphthalenedicarboxylic acid, hydroquinone, biphenol and/or p-hydroxybenzoic acid where the rate of polymerization of LCPs is slowed when prepared to high molecular weight/IV in the melt so that stoichiometry is better maintained, high yields of polymer are maintained, plugging of the reactor condensing system is minimized or eliminated, and the preparation of LCPs having predetermined molecular weights/IV's is facilitated.

It is also an object of this invention to provide a process for preparing compositions containing certain LCPs in the presence of certain levels of one or more aromatic phosphonites. The new process of the invention enables the preparation of LCPs in a more controllable manner and produces products having improved thermaloxidative stability.

SUMMARY OF THE INVENTION

This invention relates to a composition comprising:
A. a liquid crystalline polyester derived from:
  (I) diacid residues selected from terephthalic acid, isophthalic acid, cyclohexanedicarboxylic acid, biphenyl dicarboxylic acid and naphthalenedicarboxylic acid;
  (II) diol residues selected from hydroquinone, resorcinol, and biphenol, and
  (III) optionally, diacid residues selected from p-hydroxybenzoic acid, m-hydroxybenzoic acid, and 6-hydroxy-2-naphthoic acid,
wherein the moles of the diol residues are equal to the moles of the diacid residues and the total of the I and II or the I, II and III mole percentages are based on the total residues which make up the liquid crystalline polyester; and
B. one or more aromatic phosphonites.

This invention further relates to the process of preparing certain liquid crystalline polyesters in the presence of one or more aromatic phosphonites wherein said one or more phosphonites are added to the monomer charge and/or to derived prepolymers prior to polycondensation.

DESCRIPTION OF THE INVENTION

The invention relates to compositions comprising certain liquid crystalline polyesters and one or more aromatic phosphonites as well as a process for preparing the compositions. More specifically, the invention relates to a composition comprising:
A. a liquid crystalline polyester derived from:
  (I) diacid residues selected from terephthalic acid, isophthalic acid, cyclohexanedicarboxylic acid, biphenyl dicarboxylic acid and naphthalenedicarboxylic acid;
  (II) diol residues selected from hydroquinone, resorcinol, and biphenol, and
  (III) optionally, diacid residues selected from p-hydroxybenzoic acid, m-hydroxybenzoic acid, and 6-hydroxy-2-naphthoic acid;
wherein the moles of the diol residues are equal to the moles of the diacid residues and the total of the I and II or the I, II and III mole percentages are based on the total residues which make up the liquid crystalline polyester; and
B. one or more aromatic phosphonites.

Preferred examples of monomers from which component (I) may be derived are terephthalic acid; naphthalenedicarboxylic acid, preferably, 2,6-naphthalenedicarboxylic acid; and cyclohexanedicarboxylic acid, preferably, 1,4-cyclohexanedicarboxylic acid. More preferred dicarboxylic acids are terephthalic acid and naphthalenedicarboxylic acid.

Preferred examples of monomers from which component (II) may derived are hydroquinone, and biphenol, preferably 4,4'-biphenol.

A preferred example of a monomer from which component (III) may derived is p-hydroxybenzoic acid.

It is preferred that the LCP compositions of the invention comprise about 1.5 to about 25, preferably, about 5 to about 15 mole percent terephthalic acid (T) residues; about 6.5 to about 37, preferably, about 15 to about 25 mole percent 2,6-naphthalenedicarboxylic acid (N) residues; about 16 to 42, preferably, about 20 to about 30 mole percent hydroquinone (HQ) residues; about 17 to 67, preferably, about 30 to about 50 mole percent p-hydroxybenzoic acid (PHB) residues; where the total mole percent of T, N, HQ and PHB is equal to 100.

Particularly, the LCP compositions of the invention comprise about 0.01 to 5.0 weight % of one or more aromatic phosphonites, preferably 0.5 to 3.0 weight %, more preferably, 0.1 to 2.0 weight % based on the total polymer weight.

The LCP compositions of the invention preferably have the following characteristics: the T:N molar ratio is about 10:90 to about 60:40, preferably about 20:80 to about 40:60, where the moles of HQ are equal to the total moles of T and N, the liquid crystalline polyesters have melting points determined by differential scanning calorimetry (DSC) equal to or less than 375° C.

The aromatic phosphonites of the present invention generally have the following structure:

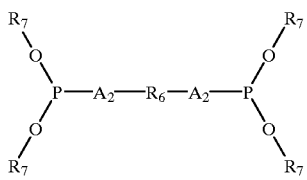

wherein $A_2$ is independently selected from the group consisting of oxygen or a chemical bond; $R_6$ is an aromatic radical and $R_7$ is independently selected from the group consisting of aliphatic or aromatic radicals. It is preferred that $A_2$ is a chemical bond. It is also preferred that $R_6$ is 4,4-biphenylene. It is further preferred that $R_7$ is substituted aryl. It is even further preferred that $A_2$ is a chemical bond, $R_6$ is 4,4biphenylene, and $R_7$ is substituted aryl.

Preferably, the aromatic phosphonites useful in the invention have the following structure:

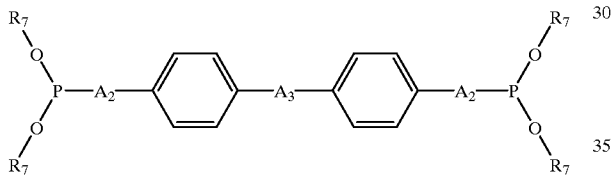

wherein $A_2$ is independently selected from the group consisting of oxygen or a chemical bond; $A_3$ is a chemical bond, S, $SO_2$, O, CO, alkylene or alkylidene containing from 1 to about 8 carbon atoms; and $R_7$ is independently selected from the group consisting of aliphatic radicals containing from about 1 to 25 carbon atoms, or substituted or unsubstituted aromatic radicals of from about 6 to 30 carbon atoms. The $R_7$ groups in all of the structures are preferably independently selected from the group consisting of the following: methyl; ethyl; isopropyl; butyl; isobutyl; t-butyl; phenyl; linear or branched alkyl from about 1 to about 25 carbon atoms; aryl substituted phenyl containing about 6 to 30 carbon atoms; halogen substituted phenyl; hydroxy substituted $C_6$ to $C_{30}$ aryl; naphthyl; $C_1$ to $C_{25}$ alkyl or $C_6$ to $C_{30}$ aryl; substituted naphthyl; and halogen substituted naphthyl.

It is preferred that $R_7$ is selected from the group consisting of the following: phenyl; aryl substituted phenyl containing about 6 to 30 carbon atoms; halogen substituted phenyl; naphthyl; $C_6$ to $C_{30}$ aryl; substituted naphthyl; and halogen substituted naphthyl.

It is more preferred that $R_7$ is selected from $C_1$–$C_8$ substituted aromatic radicals. $R_7$ is, even more preferrably, one or more t-butylphenyl pendent groups.

The preferred $R_7$ groups of the invention are independently selected from the structures:

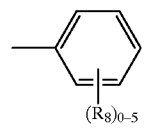

wherein $R_8$ is independently selected from an alkyl group of about 1 to 6 carbon atoms. It is preferred that $R_8$ is t-butyl.

Even more specifically, the $R_7$ groups as represented in all of the structures depicted herein are preferably independently selected from the structures:

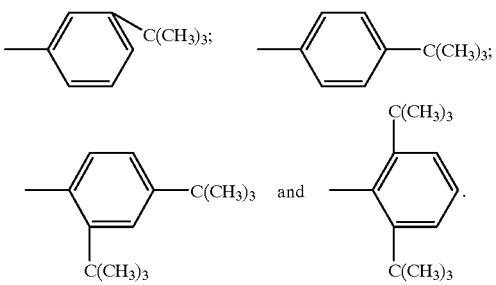

In particular, two of the more preferred phosphonites of the invention includes tetrakis [2,4-di-tert-butyl-phenyl]-4,4'-biphenylene diphosphonite and tetrakis [2,6-di-tert-butyl-phenyl]-4,4-biphenylene diphosphonite.

Even more particularly, the more preferred phosphonites of the invention have one of the following structures:

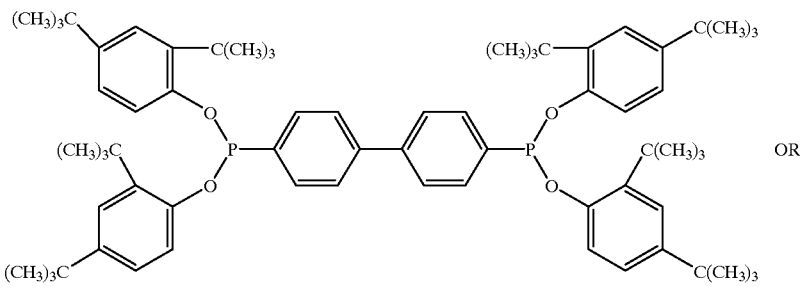

OR

-continued

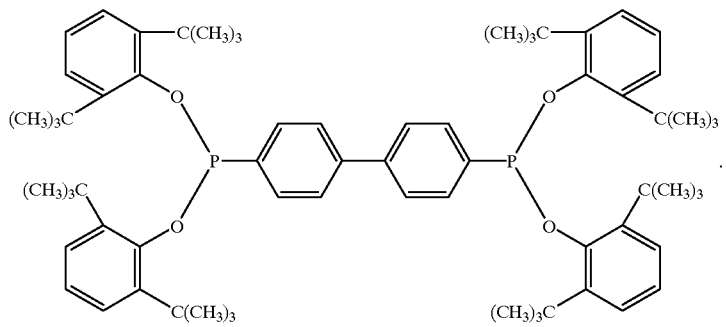

The LCP polyesters of the invention may be prepared by any method known in the art, i.e., U.S. Pat. No. 4,169,933.

The LCP polyesters in the invention may have inherent viscosities of about 3 to about 11 dL/g, preferably about 5 to about 10 dL/g, measured at 25° C. in 60:40 by weight pentafluorophenol/1,2,4-trichlorobenzene at 0.1 g/100 mL in a Schoft Gerate viscometer.

However, this invention also involves the process of preparing liquid crystalline polyesters (LCPs) as described above in the presence of one or more aromatic phosphonites. All of the embodiments of the compositions described herein apply to the process embodiments described herein. Any composition described herein is capable of being prepared by the process of the invention. Preferred compositions of the invention are also preferred in the process of the invention.

The process of the invention may be practiced by those skilled in the art, such as by heating a mixture of the dicarboxylic acids, the acyl derivatives of aromatic dihydroxy compounds and p-hydroxybenzoic acid, and the aromatic phosphonite compound with or without a catalyst to form the LCP and a volatile carboxylic acid. The aromatic phosphonite compound(s) are, preferably, added with the initial charge of monomers. Alternatively, the process of the invention may be practiced by heating a mixture of the dicarboxylic acid(s), aromatic dihydroxy compound(s), hydroxycarboxylic acid (if used), and aromatic phosphonite compound(s) in a reactor with an aliphatic acid anhydride (such as acetic or propionic anhydride) in the presence or absence of a catalyst, to first carry out the acylation of the hydroxy groups and then effect the polycondensation reaction by further heating at a temperature sufficiently high to maintain the polymer in the molten state while applying vacuum to increase the inherent viscosity (IV)/molecular weight to the desired level.

It is preferred that the aromatic phosphonite compound(s) be added prior to polycondensation. The phosphonite compound may be added with the initial monomer charge. It also may be added during polymerization after the LCP polymer attains an inherent viscosity of about 0.3 to 3.0 dL/g (the pre-polymer stage). For those skilled in the art, a useful variation of this alternative method is the separate acylation of the hydroxy-containing monomers in a first reactor, transferring this product to a second reactor, adding the dicarboxylic acid(s), and carrying out the polycondensation reaction as before described. The aromatic phosphonite compound(s) may be added to the first or second reactor in this multi-step process.

Also, the process of the invention may include the preparation of a relatively low molecular weight prepolymer by one of the previously described methods and further polymerizing it to high molecular weight by solid-state polymerization techniques well known to those skilled in the art.

This use of the aromatic phosphonite(s) in this solid-state polymerization method is also a very desirable variation of the process of the invention. Also, the process of the invention may include heating the previously described materials with or without a catalyst in an extruder to form a prepolymer which may be further polymerized to high molecular weight by solid-state polymerization techniques well known to those skilled in the art. The composition of the invention may also be prepared by melt polymerization.

Suitable catalysts include dialkyl metal oxide (preferably dialkyl tin oxide), diaryl metal oxide (preferably diaryl tin oxide), titanium dioxide, alkoxy titanium silicates, titanium alkoxides, alkali metal and alkaline earth metal salts of carboxylic acids (preferably sodium acetate), gaseous acid catalysts such as Lewis acids (e. g., $BF_3$), hydrogen halides (e. g., HCl), and the like. The quantity of catalyst utilized is typically about 50 to about 500 parts per million, based on the total weight of starting materials (less the acyl anhydride, if any, used as described below). If a multi-step reaction process is used as above described, the catalyst may be added to the acylation or polycondensation steps. For purposes of this invention, the use of about 50 to about 200 parts per million by weight of at least one alkali metal-containing catalyst is sufficient.

The process of the invention has the advantage of a slower and more controllable reaction rate when the LCP is built up to high molecular weight by a melt phase procedure. Advantages of the reduced polymerization rate include (a) a more easily controllable process and (b) fewer process problems such as plugging of the reactor condensing system with monomers (such as hydroquinone, hydroquinone diacetate, or terephthalic acid) that have significant volatility to co-distill and/or sublime during the process.

The LCP compositions prepared by the process of the invention are useful for a variety of end uses requiring a combination of good tensile and flexural properties coupled with the excellent moldability (shear-thinning behavior) and thermal stability required when extruding or injection molding intricately designed parts.

The LCP compositions prepared by the process of the invention are also useful in extruded or blown film applications requiring exceptional barrier properties or chemical resistance and as an overlay for corrosive applications. When filled with glass fibers or other fillers, they are useful for electronic applications, electrical connectors, and structural applications.

The LCP compositions prepared by the process of the invention may contain various additives and fillers. These additives may be compounded with the LCP compositions by methods well known to those skilled in the art, such as by extrusion of a physical mixture of the materials in an extruder. Some of these materials (such as carbon black) may be added to the reactor before or during the preparation of the LCPs.

The fillers may be in fibrous, particulate, or flaky form, depending on the intended use of the material. Preferred additives include antioxidants, titanium dioxide, carbon black, clay, flame retardants, drip suppressants and other pigments.

Examples of fibrous fillers include inorganic fibrous materials such as glass fiber, silica fiber, silica/alumina fiber, alumina fiber, zirconia fiber, boron nitride fiber, silicon nitride fiber, boron fiber, potassium titanate fiber, and fibrous materials of metals such as stainless steel, aluminum, titanium, copper, and brass. Glass fiber is especially useful as a fibrous filler. It is also possible to use high-melting organic fibrous materials such as polyamide, polyester, or acrylic resin.

Examples of particulate fillers include carbon black, graphite, silica, quartz powder, glass beads, milled glass fiber, glass balloons, glass powder, silicates such as calcium silicate, aluminum silicate, kaolin, talc, clay (such Montmorillonite clay), diatomaceous earth, and wollastonite, metallic oxides such as iron oxide, titanium oxide, zinc oxide, antimony trioxide, and alumina, metal carbonates such as calcium carbonate and magnesium carbonate, metal sulfates such as calcium sulfate and barium sulfate, and various other powdery materials such as ferrite, silicon carbide, silicon nitride, and boron nitride.

Examples of flaky inorganic materials include mica, glass flake, and various metallic foils.

Examples of organic fillers include heat-resistant, high strength synthetic fibers such as an organic polyester fiber, liquid crystal polymer fiber, aromatic polyamide fiber, and polyimide fiber.

The organic and inorganic fillers may be used alone or in combination of two or more at levels up to 60 weight percent or more, and these additives may be compounded with the LCP compositions of the invention by methods well known to those skilled in the art, such a by extrusion of a physical mixture of the materials in an extruder. Also, certain of the additives, such as antioxidants or carbon black, may advantageously be added to the LCPs during polymerization.

Another preferred embodiment of the invention is a molding composition comprising a blend of any of the liquid crystalline polyester compositions described herein; and 0 to 50 weight percent and preferably at least 20 weight percent glass fibers based on the total weight of the molding composition.

It is preferred that the molding composition contain glass fibers in the amount of about 30 weight percent based on the total weight of the molding composition.

It is also preferred that the glass fiber has a thickness of about 9 to 15 microns and a length of about 0.8 to 26 mm. It is further preferred that the molded article has a thickness of less than about 1.5 mm.

The compositions of the invention are also useful as molding compositions. Also, the compositions of the invention are useful in the preparation of molded articles.

This invention can be further illustrated by the following examples of preferred embodiments thereof, although it will be understood that these examples are included merely for purposes of illustration and are not intended to limit the scope of the invention unless otherwise specifically indicated. The starting materials are commercially available unless otherwise indicated.

EXAMPLES

In the examples, inherent viscosities (I. V.'s) of the LCPs are measured at 25° C. in 60/40 pentafluorophenol/1,2,4-trichlorobenzene at 0.1 g/100 ml in a Schott Gerate viscometer. The samples are dissolved by stirring at room temperature.

Melting points are determined using a Differential Scanning Calorimeter, Model 2920, using a Thermal Analyst 2200 control system with LNCA II accessory at a heating rate of 20° C./minute.

Thermogravimetric analyses (TGA) are determined using a Thermogravimetric Analyzer, Model 2950, from TA Instruments. The samples are tested by (1) scanning at 20° C./minute from 25° C. to 600° C. in nitrogen ($N_2$) or air (flow rate=40 cc/min) and (2) heating isothermally at 345° C. for 30 minutes in nitrogen ($N_2$) and measuring the weight loss.

The composition of the liquid crystalline polyesters is determined by hydrolyzing about 100 mg of the polyester in a magnetically stirred culture tube in 2 ml of deoxygenated dimethyl sulfoxide—d6 and 0.5 ml of deoxygenated 5 N NaOH in methanol—d4. The hydrolysis is carried out at 80° C. After the hydrolysis, the tube is cooled slightly and then 5 ml of deoxygenated $D_2O$ containing a reference is added to dissolve all the solids. The solution is then added to a NMR tube and capped. The proton NMR spectral data are collected with a JEOL Delta 270 Spectrometer operating at 270.05 MHz for observation of the proton nucleus.

The melt viscosity of the various samples of LCP is determined with a Rheometrics Mechanical Spectrometer (RMS 800) with 25 mm parallel plates. Samples are vacuum dried at 100° C. overnight or longer before testing. Samples are initially melted and held at 365° C. for two minutes and then cooled to 345° C. under a nitrogen blanket. The dual heating sequence is necessary to obtain reproducible results with minimum degradation of the sample. The measurement of melt viscosity is begun 10 minutes after the sample is loaded into the spectrometer. All measurements are made with 10% strain at which the strain effect on the rheological properties is negligible.

Comparative Example 1

This example illustrates the rapid rate of build up during the melt polymerization of an LCP prepared in the absence of an aromatic phosphonite. The composition is 8.6T-20N-28.6(HQ)-42.8(PHB), where "T" is terephthalic acid; "N" is 2,6-naphthalenedicarboxylic acid; (HQ) is hydroquinone; and (PHB) is p-hydroxybenzoic acid.

A 500-ml, 3-necked flask is equipped with a stainless steel stirrer and provisions for maintaining a nitrogen atmosphere, applying vacuum, and removing volatile materials from the polymerization. Into the flask are placed:

5.00 g (0.03 mole) Terephthalic acid 15.10 g (0.07 mole) 2,6-Naphthalenedicarboxylic acid 11.80 g (0.107 mole, 7 mole % excess) Hydroquinone, photo grade 20.7 g (0.15 mole) p-Hydroxybenzoic acid and 0.0131 g (112 ppm K) Potassium acetate The flask is evacuated to 0.5 torr and bled to nitrogen three times to remove the air, and then the following are added:

44.6 g (0.437 mole) Acetic anhydride, 20% excess over the equivalents of hydroxyl and 30 ml Acetic acid.

The flask is then heated with stirring under nitrogen to 140° C. for 3 hours, to 280° C. during 30 minutes and held for 60 minutes, to 300° C. for 60 minutes, to 320° C. for 60 minutes, and to 350° C. for 5 minutes. Vacuum is then applied at 350° C. to 300 torr during 5 minutes and held for 15 minutes. The pressure is further reduced to 0.30 torr during 5 minutes and held for 3 minutes to obtain a very high melt viscosity, opaque-tan polymer. The polymer is light tan in color and has an IV of 9.48 and a melt viscosity of 157,200 poise at 345degC/1 radian/second. An analysis of the polymer indicates the composition is 8.6T-20N-28.6 (HQ)-42.8(PHB).

Example 1

This example illustrates the reduction in melt polymerization buildup rate when 1.0 weight % of an aromatic phosphonite is added with the monomer charge. The composition is 8.6T-20N-28.6(HQ)-42.8(PHB), where "T" is terephthalic acid; "N" is 2,6-naphthalenedicarboxylic acid; (HQ) is hydroquinone; and (PHB) is p-hydroxybenzoic acid.

A 500-ml, 3-necked flask is equipped with a stainless steel stirrer and provisions for maintaining a nitrogen atmosphere, applying vacuum, and removing volatile materials from the polymerization. Into the flask are placed:

5.009 (0.03 mole) Terephthalic acid 15.10 g (0.07 mole) 2,6-Naphthalenedicarboxylic acid 11.80 g (0.107 mole, 7 mole % excess) Hydroquinone, photo grade 20.7 g (0.15 mole) p-Hydroxybenzoic acid 0.0131 g (112 ppm K) Potassium acetate and 0.455 g (1.0 weight %) Tetrakis(2,4-di-t-butyl)-4,4'-biphenylene phosphonite (tradename Sandostab P-EPQ, sold by Clariant Corporation).

The flask is evacuated to 0.5 torr and bled to nitrogen three times to remove the air, and then the following are added:

44.6 g (0.437 mole) Acetic anhydride, 20% excess over the equivalents of hydroxyl and 30 ml Acetic acid The flask is then heated with stirring under nitrogen to 140° C. for 3 hours, to 280° C. during 30 minutes and held for 60 minutes, to 300° C. for 60 minutes, to 320° C. for 60 minutes, and to 350° C. for 5 minutes. Vacuum is then applied at 350° C. to 300 torr during 5 minutes and held for 15 minutes. The pressure is further reduced to 0.30 torr during 5 minutes and held for 24 minutes to obtain a very high melt viscosity, opaque-tan polymer. (It should be noted that about 8X longer time under full vacuum is required to attain an IV similar to that attained in Comparative Example 1.) The polymer is light tan in color and has an IV of 9.60 and a melt viscosity of 109,500 poise at 345 degC/1 radian/second. An analysis of the polymer indicates the composition is 8.6T-20N-28.6(HQ)-42.8(PHB).

Example 2

This example illustrates the excellent thermal stability of an LCP prepared in the presence of an aromatic phosphonite. The composition is 8.6T-20N-28.6(HQ)42.8(PHB), where "T" is terephthalic acid; "N" is 2,6-naphthalenedicarboxylic acid; (HQ) is hydroquinone; and (PHB) is p-hydroxybenzoic acid.

The LCP samples prepared in Comparative Example 1 and in Example 1 are tested under different specific conditions to illustrate the effect of the aromatic phosphonite (added with the initial charge of monomers) on the thermal/oxidative stability. The results are shown in Table 1.

Examples 3 & 4

These examples illustrate that "just any stabilizer containing phosphorus" is not suitable in the process of this invention. Example 3 is a control containing no "stabilizer"; Example 4 shows the result when 0.3 weight % of the phosphite stabilizer, Weston 618, is present during the preparation of the LCP.

Example 3

A 1000-mi, single-necked flask is equipped with a stainless steel stirrer and provisions for maintaining a nitrogen atmosphere, applying vacuum, and removing volatile materials from the polymerization. Into the flask are placed:

28.22 g (0.17 mole) Terephthalic acid 36.72 g (0.17 mole) 2,6-Naphthalenedicarboxylic acid 72.56 g(0.374 mole, 10 mole % excess) Hydroquinone diacetate 91.80 g (0.51 mole) p-Acetoxybenzoic acid The flask is evacuated to 0.5 torr and bled to nitrogen three times to remove the air and then heated in a molten metal bath under an atmosphere of nitrogen as follows: 265° C. for 2 hours, 320° C. for 60 minutes, 330° C. for 60 minutes, 340° C. for 60 minutes, and 350° C. for 15 minutes. Vacuum is then applied at 350° C. during 10 minutes to 0.5 torr and continued for 5 minutes to attain a high-melt-viscosity, light-tan polymer that has an IV of 7.43 and gives a very tough film when pressed in a Hannifin press at 340° C.

Example 4

Example 3 is repeated except 0.454 g (0.3 weight %, based on the theoretical weight of LCP being prepared) of 3,9-di(octadecyloxy)-2,4,8,10-tetraoxo-3,9-diphosphaspiro [5.5]undecane (tradename Weston 618, phosphite stabilizer widely used in polymers) is added at the same time the other monomers are added, and the heating schedule is as follows: 265° C. for 2 hours, 320° C. for 60 minutes, 330° C. for 60 minutes, 340° C. for 40 minutes, and 350° C. for 15 minutes. Vacuum is then applied at 350° C. during 10 minutes to 0.5 torr and continued for 9 minutes to attain a high-melt-viscosity, medium-brown polymer that has an IV of 5.68 and gives a very tough film when pressed in a Hannifin press at 340° C.

TABLE 1

TGA Stability Data for 8.6T-20N-28.6(HQ)-42.8(PHB)

| Example Number | Wt % Phosphonite Present during Polymer Prep | 10% Weight Loss At, C. | | Wt Loss, %, after 30 min @ 345 Deg C. |
|---|---|---|---|---|
| | | In N$_2$ | In Air | In N$_2$ |
| Example #1 | 1.0 | 533 | 533 | 0.32 |
| Comparative Example #1 | 0.0 | 506 | 504 | 0.52 |

The invention has been described in detail with particular reference to preferred embodiments thereof, but it will be understood that variations and modifications can be effected within the spirit and scope of the invention. Moreover, all patents, patent applications (published and unpublished, foreign or domestic), literature references or other publications noted above are incorporated herein by reference for any disclosure pertinent to the practice of this invention.

It is claimed:

1. A composition comprising:
   A. a liquid crystalline polyester derived from:
      (I) diacid residues selected from terephthalic acid, isophthalic acid, cyclohexanedicarboxylic acid, biphenyl dicarboxylic acid and naphthalenedicarboxylic acid;

(II) diol residues selected from hydroquinone, resorcinol, and biphenol, and (III) optionally, residues selected from p-hydroxybenzoic acid, m-hydroxybenzoic acid, and 6-hydroxy-2-naphthoic acid, wherein the moles of the diol residues are equal to the moles of the diacid residues and the total of the I and II or the I, II and III mole percentages are based on the total residues which make up the liquid crystalline polyester; and B. one or more aromatic phosphonites.

2. The composition of claim 1 wherein component I is selected from terephthalic acid, naphthalenedicarboxylic acid and cyclohexanedicarboxylic acid.

3. The composition of claim 1 wherein component I is selected from terephthalic acid and naphthalenedicarboxylic acid.

4. The composition of claim 1 wherein component II is selected from hydroquinone and biphenol.

5. The composition of claim 1 wherein component III comprises p-hydroxybenzoic acid.

6. The composition of claim 1 comprising about 1.5 to about 25 mole percent terephthalic acid (T) residues, about 6.5 to about 37 mole percent 2,6-naphthalenedicarboxylic acid (N) residues, about 16 to 42 mole percent hydroquinone (HQ) residues, about 17 to 67 mole percent p-hydroxybenzoic acid (PHB) residues; wherein the total mole percent of T, N, HQ and PHB is equal to 100.

7. The composition of claim 1 comprising about 5 to about 15 mole percent terephthalic acid (T) residues, about 15 to about 25 mole percent 2,6-naphthalenedicarboxylic acid (N) residues, about 20 to 30 mole percent hydroquinone (HQ) residues, about 30 to 50 mole percent p-hydroxybenzoic acid (PHB) residues; wherein the total mole percent of T, N, HQ and PHB is equal to 100.

8. The composition of claim 1 wherein the total amount of aromatic phosphonites are 0.01 to about 5.0 weight %, based on the total weight of the composition.

9. The composition of claim 1 wherein the total amount of aromatic phosphonites are 0.05 to about 3.0 weight %, based on the total weight of the composition.

10. The composition of claim 1 wherein the total amount of aromatic phosphonites are 0.1 to about 2.0 weight %, based on the total weight of the composition.

11. The composition of claim 5 wherein the terephthalic acid (T): 2,6-naphthalenedicarboxylic acid (N) molar ratio is about 10:90 to about 60:40, the moles of hydroquinone (HQ) are equal to the total moles of terephthalic acid (T) and 2,6-naphthalenedicarboxylic acid (N), the liquid crystalline polyesters have melting points determined by differential scanning calorimetry (DSC) equal to or less than 375° C.

12. The composition of claim 5 wherein the terephthalic acid (T): 2,6-naphthalenedicarboxylic acid (N) molar ratio is about 20:80 to about 40:60, the moles of hydroquinone (HQ) are equal to the total moles of terephthalic acid (T) and 2,6-naphthalenedicarboxylic acid (N), the liquid crystalline polyesters have melting points determined by differential scanning calorimetry (DSC) equal to or less than 375° C.

13. The composition of claim 1 wherein said aromatic phosphonite has the following structure:

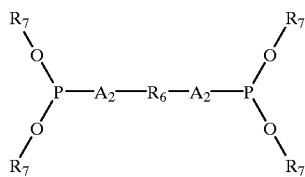

wherein $A_2$ is independently selected from the group consisting of oxygen or a chemical bond; $R_6$ is an aromatic radical and $R_7$ is independently selected from the group consisting of aromatic radicals.

14. The composition of claim 13 wherein $A_2$ is a chemical bond.

15. The composition of claim 13 wherein $R_6$ is 4,4-biphenylene.

16. The composition of claim 13 wherein $R_7$ is substituted aryl.

17. The composition of claim 13 wherein $A_2$ is a chemical bond, $R_6$ is 4,4-biphenylene, and $R_7$ is substituted aryl.

18. The composition of claim 1 wherein said aromatic phosphonite has the following structure:

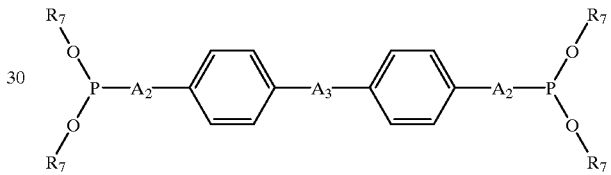

wherein $A_2$ is independently selected from the group consisting of oxygen or a chemical bond; $A_3$ is a chemical bond, S, $SO_2$, O, CO, alkylene or alkylidene containing from 1 to about 8 carbon atoms; and $R_7$ is independently selected from the group consisting of substituted or unsubstituted aromatic radicals of from about 6 to 30 carbon atoms.

19. The composition of claim 18 wherein $R_7$ is selected from the group consisting of the following: phenyl; aryl substituted phenyl containing about 6 to 30 carbon atoms; halogen substituted phenyl; naphthyl; $C_6$ to $C_{30}$ aryl; substituted naphthyl; and halogen substituted naphthyl.

20. The composition of claim 19 wherein $R_7$ is selected from $C_1$–$C_8$ substituted aryl radicals.

21. The composition of claim 20 wherein $R_7$ is one or more t-butylphenyl pendent groups.

22. The composition of claims 13 or 18 wherein $R_7$ has the following structure:

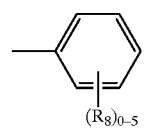

wherein $R_8$ is independently selected from an alkyl group of about 1 to 6 carbon atoms.

23. The composition of claim 22 wherein $R_8$ is t-butyl.

24. The composition of claim 21 wherein $R_7$ is independently selected from the structures

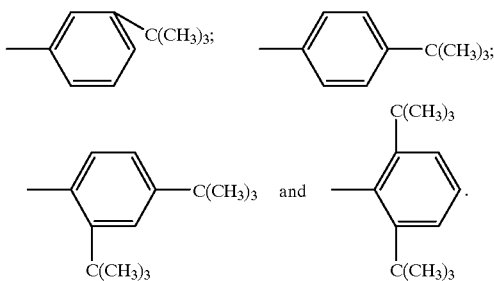

25. The composition of claim 24 wherein said aromatic phosphonite is tetrakis (2,4-di-tert-butyl-phenyl)-4,4'-biphenylene diphosphonite.

26. The composition of claim 24 wherein said aromatic phosphonite is tetrakis (2,6-di-tert-butyl-phenyl)-4,4'-biphenylene diphosphonite.

27. The composition of claim 18 wherein said aromatic phosphonite has the following structure:

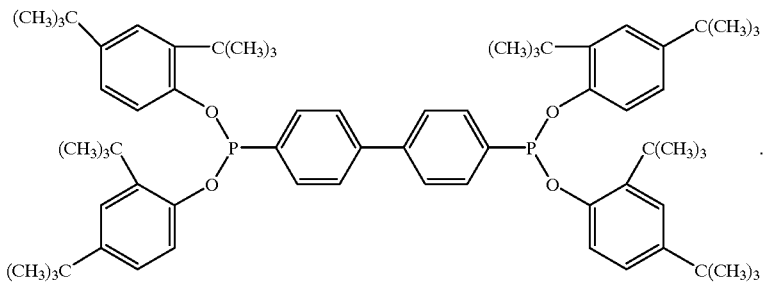

28. The composition of claim 18 wherein said aromatic phosphonite has the following structure:

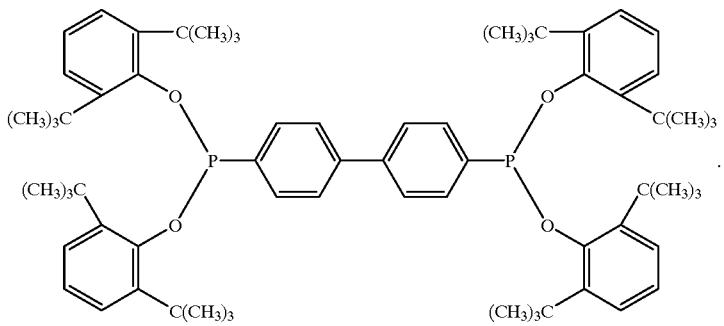

29. The composition of claim 1 prepared by a process comprising
   a) heating a mixture comprising an initial charge of monomers comprising the diacid residues, the diol residues, and the optional residues selected from from p-hydroxybenzoic acid, m-hydroxybenzoic acid, and 6-hydroxy-2-naphthoic acid, and
   b) polycondensing the mixture to form the liquid crystalline polyester, wherein said aromatic phosphonite is added prior to polycondensation.

30. The composition of claim 29 wherein said aromatic phosphonite is added with the initial monomer charge.

31. The composition of claim 29 wherein said aromatic phosphonite is added during polymerization after the polyester attains an inherent viscosity of about 0.3 to 3.0 dL/g.

32. The composition of claim 1 prepared by solid-state polymerization.

33. The composition of claim 1 prepared by melt polymerization.

34. The composition of claim 29 wherein said polyester is prepared using a catalyst selected from the group consisting of dialkyl metal oxide, diaryl metal oxide, titanium dioxide, alkoxy titanium silicates, titanium alkoxides, alkali metal and alkaline earth metal salts of carboxylic acids, gaseous acid catalysts, and hydrogen halides.

35. The composition of claim 34 wherein said alkaline earth metal salt of carboxylic acid is sodium acetate.

36. The composition of claim 34 wherein said catalyst is utilized in the amount of about 50 to about 500 parts per million based on the total weight of starting materials.

37. The composition of claim 36 wherein said catalyst is utilized in the amount of about 50 to about 200 parts per million based on the total weight of starting materials.

38. The composition of claim 34 wherein step a) comprises an acylation step, and said catalyst is added during the acylation step.

39. The composition of claim 29 wherein a catalyst is added in the polycondensation step.

40. The composition of claim 1 further comprising one or more additives.

41. The composition of claim 40 wherein said additives comprise antioxidants, glass fibers, titanium dioxide, carbon black, clay, flame retardants, drip suppressants, other pigments, or a filler.

42. The composition of claim 1 having an inherent viscosity of about 3 to about 11 dL/g measured at 25° C. in 60:40 by weight pentafluorophenol/1,2,4-trichlorobenzene at 0.1 g/100 mL in a Schott Gerate viscometer.

43. The composition of claim 1 having an inherent viscosity of about 5 to about 10 dL/g measured at 25° C. in 60:40 by weight pentafluorophenol/1,2,4-trichlorobenzene at 0.1 g/100 mL in a Schott Gerate viscometer.

44. A process for preparing a liquid crystalline polyester composition comprising the step of adding, prior to polycondensation of said polyester, an aromatic phosphonite to monomers and derived pre-polymers used in the preparation of a liquid crystalline polyester, wherein said monomers and derived pre-polymers comprise the following:

(I) diacid residues selected from terephthalic acid, isophthalic acid, cyclohexanedicarboxylic acid, biphenyl dicarboxylic acid and naphthalenedicarboxylic acid; and (II) diol residues selected from hydroquinone, resorcinol, biphenol, (III) optionally, residues selected from p-hydroxybenzoic acid, m-hydroxybenzoic acid, and 6-hydroxy-2-naphthoic acid, wherein the moles of the diol residues are equal to the moles of the diacid residues and the total of the I and II or the I, II and III mole percentages are based on the total residues which make up the liquid crystalline polyester.

45. The process of claim 44 wherein component I is selected from terephthalic acid, naphthalenedicarboxylic acid and cyclohexanedicarboxylic acid.

46. The process of claim 45 wherein component I is selected from terephthalic acid and naphthalenedicarboxylic acid.

47. The process of claim 44 wherein component II is selected from hydroquinone and biphenol.

48. The process of claim 44 wherein component III comprises p-hydroxybenzoic acid.

49. The process of claim 44 wherein said composition comprises about 1.5 to about 25 mole percent terephthalic acid (T) residues, about 6.5 to about 37 mole percent 2,6-naphthalenedicarboxylic acid (N) residues, about 16 to 42 mole percent hydroquinone (HQ) residues, about 17 to 67 mole percent p-hydroxybenzoic acid (PHB) residues; wherein the total mole percent of T, N, HQ and PHB is equal to 100.

50. The process of claim 49 wherein said composition comprises about 5 to about 15 mole percent terephthalic acid (T) residues, about 15 to about 25 mole percent 2,6-naphthalenedicarboxylic acid (N) residues, about 20 to 30 mole percent hydroquinone (HQ) residues, about 30 to 50 mole percent p-hydroxybenzoic acid (PHB) residues; wherein the total mole percent of T, N, HQ and PHB is equal to 100.

51. The process of claim 44 wherein the total amount of aromatic phosphonites are 0.01 to about 5.0 weight %, based on the total weight of the composition.

52. The process of claim 51 wherein the total amount of aromatic phosphonites are 0.05 to about 3.0 weight %, based on the total weight of the composition.

53. The process of claim 52 wherein the total amount of aromatic phosphonites are 0.1 to about 2.0 weight %, based on the total weight of the composition.

54. The process of claim 44 wherein the T:N molar ratio of said composition is about 10:90 to about 60:40, the moles of HQ are equal to the total moles of T and N, the liquid crystalline polyesters have melting points determined by differential scanning calorimetry (DSC) equal to or less than 375° C.

55. The process of claim 54 wherein the T:N molar ratio of said composition is about 20:80 to about 40:60, the moles of HQ are equal to the total moles of T and N, the liquid crystalline polyesters have melting points determined by differential scanning calorimetry (DSC) equal to or less than 375° C.

56. The process of claim 44 wherein said aromatic phosphonite has the following structure:

wherein $A_2$ is independently selected from the group consisting of oxygen or a chemical bond; $R_6$ is an aromatic radical and $R_7$ is independently selected from the group consisting of aromatic radicals.

57. The process of claim 56 wherein $A_2$ is a chemical bond.

58. The process of claim 56 wherein $R_6$ is 4,4-biphenylene.

59. The process of claim 56 wherein $R_7$ is substituted aryl.

60. The process of claim 56 wherein $A_2$ is a chemical bond, $R_6$ is 4,4-biphenylene, and $R_7$ is substituted aryl.

61. The process of claim 44 having the following structure:

wherein $A_2$ is independently selected from the group consisting of oxygen or a chemical bond; $A_3$ is a chemical bond, S, $SO_2$, O, CO, alkylene or alkylidene containing from 1 to about 8 carbon atoms; and $R_7$ is independently selected from the group consisting of substituted or unsubstituted aromatic radicals of from about 6 to 30 carbon atoms.

62. The process of claim 61 wherein $R_7$ is selected from $C_1$–$C_8$ substituted aryl radicals.

63. The process of claim 62 wherein $R_7$ is one or more t-butylphenyl pendent groups.

64. The process of claim 56 wherein $R_7$ is selected from the group consisting of the following: phenyl; aryl substituted phenyl containing about 6 to 30 carbon atoms; halogen substituted phenyl; naphthyl; $C_6$ to $C_{30}$ aryl; substituted naphthyl; and halogen substituted naphthyl.

65. The process of claims 56 and 61 wherein $R_7$ has the following structure:

wherein $R_8$ is independently selected from an alkyl group of about 1 to 6 carbon atoms.

66. The composition of claim 66 wherein $R_8$ is t-butyl.

67. The process of claims 56 and 61 wherein R₇ is selected from the structures:

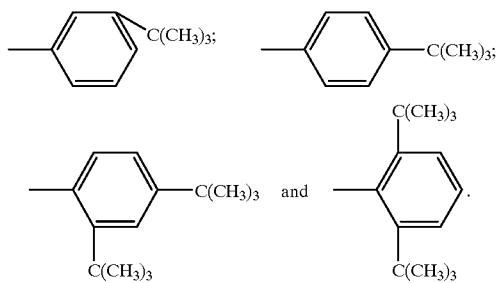

68. The process of claim 66 wherein said aromatic phosphonite is tetrakis (2,4-di-tert-butyl-phenyl)-4,4'-biphenylene diphosphonite.

69. The process of claim 66 wherein said aromatic phosphonite is tetrakis (2,6-di-tert-butyl-phenyl)-4,4'-biphenylene diphosphonite.

70. The process of claim 61 wherein said aromatic phosphonite has the following structure:

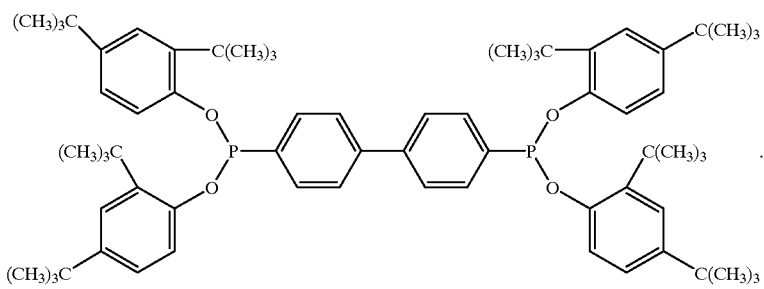

71. The process of claim 61 wherein said aromatic phosphonite has the following structure:

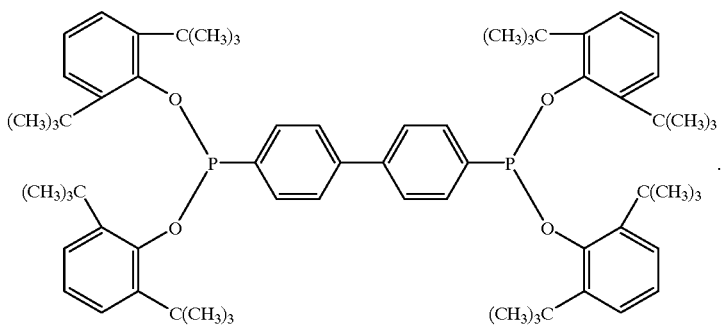

72. The process of claim 44 wherein said aromatic phosphonite is added prior to polycondensation.

73. The process of claim 72 wherein said aromatic phosphonite is added with the initial monomer charge.

74. The process of claim 72 wherein said aromatic phosphonite is added during polymerization after the polymer attains an inherent viscosity of about 0.3 to 3.0 dL/g.

75. The process of claim 44 prepared by solid-state polymerization.

76. The process of claim 44 prepared by melt polymerization.

77. The process of claim 44 wherein said polyester is prepared using a catalyst selected from the group consisting of dialkyl metal oxide, diaryl metal oxide, titanium dioxide, alkoxy titanium silicates, titanium alkoxides, alkali metal and alkaline earth metal salts of carboxylic acids, gaseous acid catalysts, and hydrogen halides.

78. The process of claim 77 wherein said alkaline earth metal salts of carboxylic acids, is sodium acetate.

79. The process of claim 77 wherein said catalyst is utilized in the amount of about 50 to about 500 parts per million based on the total weight of starting materials.

80. The process of claim 77 wherein said catalyst is utilized in the amount of about 50 to about 200 parts per million based on the total weight of starting materials.

81. The process of claim 77 wherein said process comprises an acylation step, and said catalyst is added during the acylation step.

82. The process of claim 77 wherein said catalyst is added in the polycondensation step.

83. The process of claim 79 wherein said catalyst is utilized in the amount of 100 to about 300 parts per million based on the total weight of the starting materials.

84. The process of claim 44 further comprising one or more additives.

85. The process of claim 84 wherein said additives comprise antioxidants, glass fibers, titanium dioxide, carbon black, clay, flame retardants, drip suppressants, other pigments, or a filler.

86. The process of claim 44 having an inherent viscosity of about 3 to about 11 dL/g measured at 25° C. in 60:40 by weight pentafluorophenol/1,2,4-trichlorobenzene at 0.1 g/100 mL in a Schott Gerate viscometer.

87. The process of claim 44 having an inherent viscosity of about 5 to about 10 dL/g measured at 25° C. in 60:40 by weight pentafluorophenol/1,2,4-trichlorobenzene at 0.1 g/100 mL in a Schott Gerate viscometer.

88. A molding composition comprising a blend of:
 (1) the composition of claim 1; and
 (2) at least 20 weight percent glass fibers based on the total weight of the molding composition.

89. The molding composition according to claim 88 wherein said glass fiber has a thickness of about 9 to about 15 microns and a length of about 0.8 to 26 mm.

90. A molded article comprising the composition of claim 1 wherein said article has a thickness of less than about 1.5 mm.

* * * * *

UNITED STATES PATENT AND TRADEMARK OFFICE
CERTIFICATE OF CORRECTION

PATENT NO. : 6,348,163 B1  Page 1 of 1
DATED : February 19, 2002
INVENTOR(S) : Long et al.

It is certified that error appears in the above-identified patent and that said Letters Patent is hereby corrected as shown below:

Column 2,
Line 5, delete the word "diacid"
Line 33, delete the word "diacid"

Signed and Sealed this

Twenty-first Day of May, 2002

Attest:

JAMES E. ROGAN
*Attesting Officer*  *Director of the United States Patent and Trademark Office*